United States Patent
Lance

(10) Patent No.: US 7,154,314 B2
(45) Date of Patent: Dec. 26, 2006

(54) COMMUNICATION APPARATUS INCLUDING DRIVER MEANS FOR APPLYING A SWITCHED SIGNAL TO A COMMUNICATION LINE WITH A CONTROLLED SLEW RATE

(75) Inventor: Philippe Lance, Toulouse (FR)

(73) Assignee: Freescale Semiconductor, Inc., Austin, TX (US)

( * ) Notice: Subject to any disclaimer, the term of this patent is extended or adjusted under 35 U.S.C. 154(b) by 7 days.

(21) Appl. No.: 10/519,656

(22) PCT Filed: Jun. 10, 2003

(86) PCT No.: PCT/EP03/06116

§ 371 (c)(1),
(2), (4) Date: Dec. 22, 2004

(87) PCT Pub. No.: WO2004/004259

PCT Pub. Date: Jan. 8, 2004

(65) Prior Publication Data

US 2006/0152261 A1   Jul. 13, 2006

(30) Foreign Application Priority Data

Jun. 28, 2002 (EP) .................................. 02291606

(51) Int. Cl.
*H03K 5/02* (2006.01)

(52) U.S. Cl. ...................................... 327/170; 327/108
(58) Field of Classification Search ................ 327/108, 327/111, 297, 291, 170
See application file for complete search history.

(56) References Cited

U.S. PATENT DOCUMENTS

| 5,194,761 | A | 3/1993 | Smith |
| 6,812,760 | B1* | 11/2004 | Kim et al. .................. 327/158 |
| 2001/0024477 | A1 | 9/2001 | Haycock |
| 2002/0070801 | A1 | 6/2002 | Ferianz |

FOREIGN PATENT DOCUMENTS

EP   0763917 A2   3/1997

* cited by examiner

*Primary Examiner*—Dinh T. Le

(57) ABSTRACT

A communication node including drivers for applying a switched signal to a communication line such as a CAN bus or a LIN bus, with a controlled slew rate. The driver comprises a series of transfer elements and a series of delay elements for cumulatively establishing operational connections of the transfer elements with the communication line, whereby to apply the switched signal progressively to the communication line. A feedback loop is responsive to the signal that the driver applies to the communication line for controlling the delays of the delay elements so as to control the delays with which the operational connections of the transfer elements with the communication line are established.

8 Claims, 3 Drawing Sheets

COMMUNICATION APPARATUS INCLUDING DRIVER MEANS FOR APPLYING A SWITCHED SIGNAL TO A COMMUNICATION LINE WITH A CONTROLLED SLEW RATE

FIELD OF THE INVENTION

This invention relates to communication apparatus including driver means for applying a switched signal to a communication line with a controlled slew rate.

BACKGROUND OF THE INVENTION

Local networks often make use of a communication line, such as a communication bus, over which a set of nodes communicates. A driver module in a master node applies power to the line, the driver module being switched to produce step changes in the power in the line to transmit signals to receivers in remote slave nodes over the line. The switched power signal activates the multiplexed remote nodes connected to the line and the line also selectively transmits signals from the remote nodes back to a central processing unit.

Such a bus is used in automotive vehicles, for example, the bus either comprising a single line or often comprising a twisted pair of conductors in which the current flows, the close coupling between the pair of conductors reducing their sensitivity to electromagnetic interference ('EMI'), that is to say reception of noise induced in the wires of the bus, and improving their electromagnetic compatibility ('EMC'), that is to say the radiation of parasitic fields by the currents flowing in the wires of the bus; both are critical parameters, especially in automotive applications.

Historically, in automotive applications, functions such as door locks, seat positions, electric mirrors, and window operations have been controlled directly by electrical direct current delivered by wires and switches. Such functions may today be controlled by ECUs (Electronic Control Units) together with sensors and actuators in a multiplexed Controller Area Network (CAN). The Controller Area Network (CAN) standard (ISO 11898) allows data to be transmitted by switching a voltage, at a frequency of 250 kbauds to 1 Mbaud for example, to the multiplexed receiver modules over the twisted pair cable. The receiver modules may be actuators that perform a function, for example by generating mechanical power required, or sensors that respond to activation by making measurements and transmitting the results back to the ECU over the bus.

The CAN bus was originally designed to be used as a vehicle serial data bus, and satisfies the demands of real-time processing, reliable operation in a vehicle's EMI environment, is cost-effective, and provides a reasonable data bandwidth. A variant on the CAN standard is the LIN (Local Interconnect Network) sub-bus standard (see ISO 7498), which is an extension to the CAN bus, at lower speed and on a single wire bus, to provide connection to local network clusters.

The wires of a communication bus are often long and present a substantial distributed reactive load to the transmitter to which they are connected and especially their capacitive loads may be individually variable. It is important, for example for meeting acceptable EMI and EMC performance levels, that the slew rate of the switched signals (that is to say their rate of rise and fall of amplitude) is controlled in order to enable precise timing of certain elements of the signals transmitted. In particular, in the case of a bus comprising a pair of conductors, matching of the slew rate between the two conductors is important.

SUMMARY OF THE INVENTION

The present invention provides communication apparatus as described in the accompanying claims.

DETAILED DESCRIPTION OF THE PREFERRED EMBODIMENTS

Figure 1:
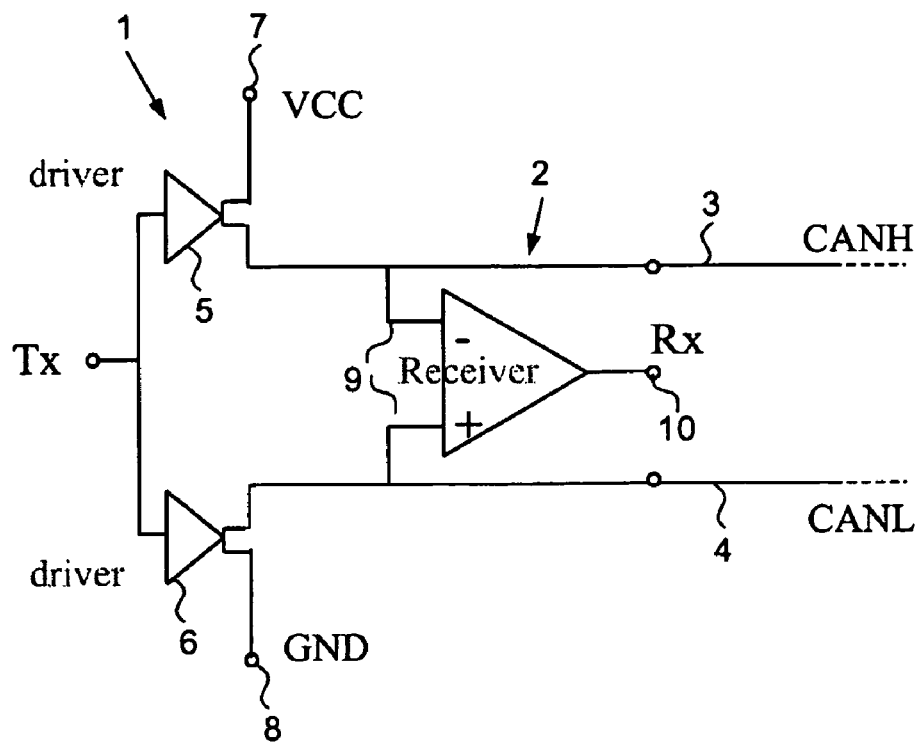
FIG. 1 is a simplified generic schematic diagram of a Controller Area Network node comprising a driver and a receiver connected to a pair of CAN bus lines.

FIG. 1 shows, by way of example, the general principle of a CAN bus system, the CAN system comprising a number of nodes, FIG. 1 showing one of the nodes comprising a driver 1 and a receiver 2, the nodes communicating over a pair of bus lines 3 and 4, the bus line 3 being the CANH line and the line 4 being the CANL line. In accordance with the CAN specifications, any one of the nodes may be a master node and anyone may be a slave node, according to the communication to be transmitted.

More particularly, the driver 1 comprises first and second driver elements 5 and 6 connected to receive an input signal Tx for transmission over the bus lines 3 and 4, the assertion of the signal Tx switching the driver 5 to connect the CANH line 3 to a voltage source 7 at a voltage VCC and the driver 6 to connect the CANL line 4 to a ground terminal 8.

The receiver 2 comprises a differential input 9 that is responsive to the difference in voltage between the CANH line 3 and the CANL line 4 to produce a digital output signal Rx at a terminal 10. It will be appreciated that, when the node is the master node, the driver 1 is active to transmit signals to remote nodes over the bus lines 3 and 4 and, when the node is a slave node, the receiver 2 is active to receive signals from other nodes over the bus lines 3 and 4.

Figure 2:
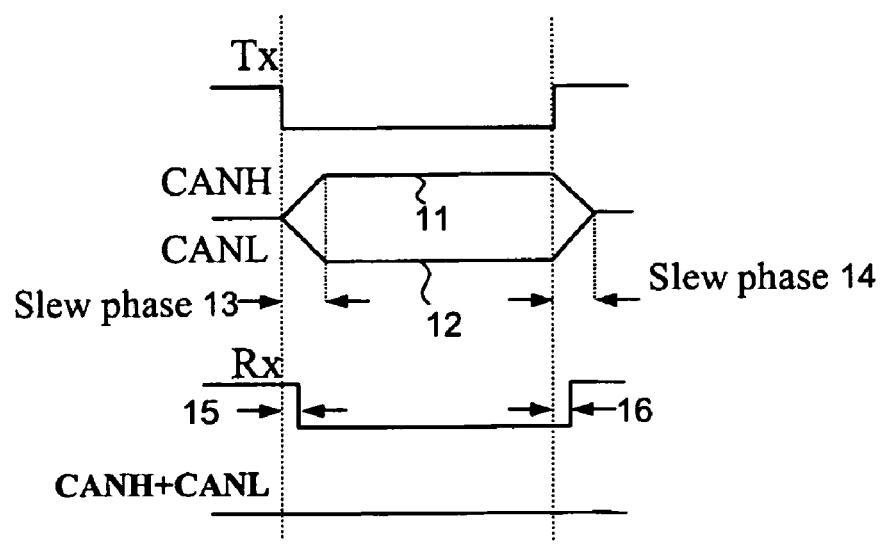
FIG. 2 is a waveform diagram of signals appearing in operation of the CAN node of FIG. 1.

FIG. 2 shows the signals appearing in a substantially ideal case in operation of the system of FIG. 1. The input signal Tx applied to the inputs of drivers 5 and 6 is a step signal. However, the bus lines 3 and 4 present substantial distributed impedances including reactive components, so that the signal 11 transmitted over the CANH bus line 3 and the signal 12 transmitted over the CANL bus line 4 are not step signals but exhibit rising edge and falling edge slew phases 13 and 14 in which the signal values change progressively. The receiver of a remote node reacts when the difference between the CANH signal 11 and the CANL signal 12 applied to its input reaches a threshold value on the rising edge and on the falling edge and accordingly, the output signal Rx exhibits its step changes with delay times 15 and 16 relative to the step changes in the input signal Tx.

In the ideal case shown in FIG. 2, the slew rates during the rising and falling slew phases 13 and 14 are identical, so that the delay times 15 and 16 of the corresponding step changes in the output receiver signal Rx are identical. Moreover, ideally, the signals flowing in the CANH line 3 and CANL line 4 are always equal and opposite with identical timing and rates of change so that the combined signal CANH+ CANL presented to the external world is always zero, theoretically reducing the electromagnetic emissions to zero. However, in practice, the distributed impedances of the lines 3 and 4 are individually variable and good matching between the high side driver 5 and the low side driver 6 is difficult to achieve. Accordingly, especially during the slew phases 13 and 14, the common mode signal CANH plus CANL is not constant and even equality between the slew rates of the rising edge and the falling edge cannot be guaranteed.

Figure 3:
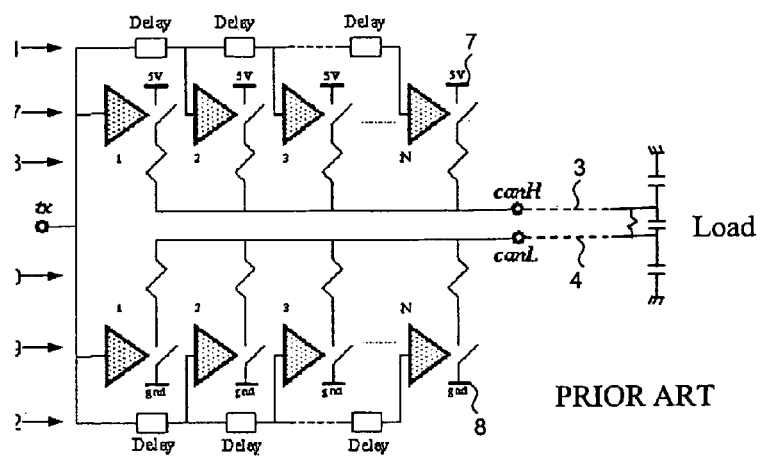
FIG. 3 is a schematic diagram of a known driver in a CAN node of the kind shown in FIG. 1.

A first improvement in the performance of the system may be obtained by the use of drivers which comprise respective series of transfer elements and delay elements for cumulatively establishing operational connections of the transfer elements with the bus lines 3 and 4 so as to apply the step changes of the input signal Tx progressively to the bus lines 3 and 4 during the slew phases 13 and 14. As shown in FIG. 3, a series of N switch elements 17 are connected between the VCC terminal 7 and the CANH line 3 through a series of N resistive elements 18. A corresponding series of (N−1) delay elements 21 are connected in series so as to trigger respective switch elements 17 with delays in time defined by the cumulative effect of the delay elements 21. Similarly a series of (N−1) delay elements 22 is connected to trigger the switch elements 19. The switch elements 17 and 19 have fast switching times.

In operation, during the slew phases 13 and 14, the step changes in the input signal Tx are progressively asserted and de-asserted on the lines 3 and 4 by the cumulative connection in parallel of the resistive elements 18 and 20. In the example shown in FIG. 3, the number N of switch elements and resistive elements is equal to 10, so that a step change in the signal Tx is applied in ten small steps to the bus lines 3 and 4 but it will be appreciated that a greater or smaller number of switch elements and resistive elements may be used, as required. The values of the resistive elements 18 and 20 are each N times the value that would be required for a single resistive element to apply the whole signal Tx to the bus lines 3 and 4 respectively.

Figure 4:
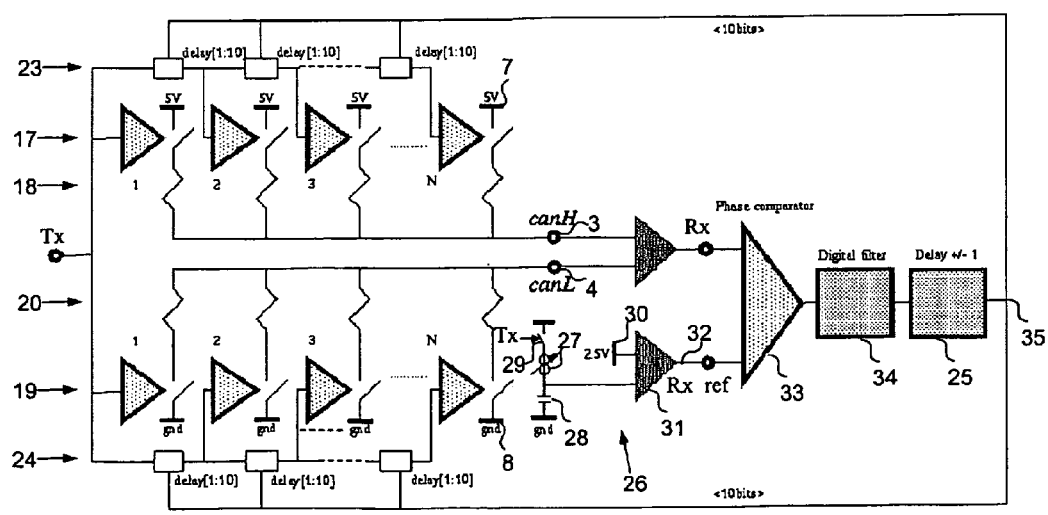
FIG. 4 is a schematic diagram of a CAN node of the kind shown in FIG. 1 in accordance with one embodiment of the invention, given by way of example.

This system presents the advantage that the slew rate during the slew phases 13 and 14 now is controlled primarily by the cumulative delay times of the delay elements of the series 21 and 22. However, the delay times of the delay elements of the series 21 and 22 are fixed and, even if the slew rates of the CANH line 3 and the CANL line 4 are now better matched, the slew rates are a function of temperature and of the capacitive load of the CANH line 3 and the CANL line 4, so that the slew rates are still difficult to control FIG. 4 shows a CAN system in accordance with one embodiment of the present invention, by way of example. The driver 1 again comprises two series of switch elements 17 and 19 switching two series of resistive elements 18 and 20 to apply the Tx signal progressively through the resistive elements 18 and 20 to the bus lines 3 and 4. However, the series of delay elements 21 and 22 are replaced by series of delay elements 23 and 24 respectively, the individual delay times of each of the delay elements of the series 23 and 24 being controlled by a feedback loop. More particularly, the feedback loop comprises a delay selection circuit 25, which increments or decrements delay times of the delay elements as a function of the signal that the drivers 5 & 6 apply through resistive elements 18 and 20 to the bus lines 3 and 4.

More particularly, the feedback loop comprises a reference signal generator 26 comprising a constant current source 27 and a calibrated capacitor 28 and a switch 29 triggered by the step changes in the input signal Tx to trigger the charging of the capacitor 28. The voltage on the capacitor 28 is compared with a reference voltage on a terminal 30 by a reference receiver 31, similar to the signal receiver 2, and the signal at the output 32 of the reference receiver 31 exhibits a step change when the voltage on the capacitor 28 exceeds or drops below the reference voltage on the terminal 30.

The outputs of the signal receiver 2 and the reference receiver 31 are applied to a phase comparator 33 that generates an output that is a function of the relative time delays between the step changes in the signals on the outputs of the two receivers. The output of the phase comparator 33 is supplied through a digital filter 34, which removes parasitic signals, to the delay selection circuit 25. The delay selection circuit 25 decrements or increments by unit amounts the delays of the delay elements of the series 23 and 24 in response to an advance or retard of the output of the signal receiver 2 relative to the output of the reference receiver 31.

In operation, at the first step change in the input signal Tx, in response to any time difference between the step changes of the output of the signal receiver 2 and of the reference receiver 31, the delay selection circuit 25 will increment or decrement the delay times of the delay elements of the series 23 and 24, the operation being repeated at any subsequent step changes in the input signal Tx, so as to synchronise the step changes of the signal receiver 2 and the reference receiver 31 after a small number of cycles. The slew rates of the signals applied to the bus lines 3 and 4 are thus controlled during the slew phases 13 and 14 so that both the slew rate and timing of the signals is controlled. The slew time of the signals is substantially independent of the loads on the bus lines 3 and 4 and of the effect of temperature on the circuit elements.

Figure 5:
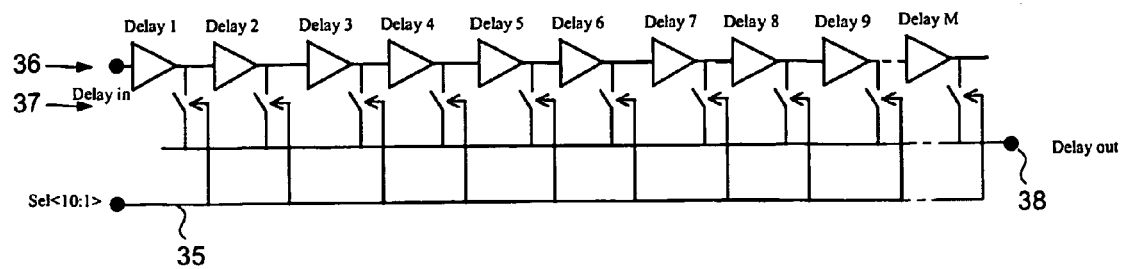
FIG. 5 is a simplified circuit diagram of a delay element in the CAN node of FIG. 4.

FIG. 5 shows the structure of each of the (N−1) delay elements of the series 23 and 24. Each of the delay elements itself comprises a set of delay sub-elements 36 connected in series to trigger each other in succession. The outputs of each of the delay sub-elements of the set 36 are connected through a respective multiplex switch element of a set 37 to an output terminal 38. The signal from the delay selection circuit 25 is applied through a connection 35 to select one of the switches of the set 37.

In operation, when a step change is applied to the input of the delay element, the step change propagates through the set of delay sub-elements 36 until it reaches the selected switch of the set 37, when the step change is asserted on the output terminal 38, with a delay that is a function of the position of the selected switch. In the preferred embodiment of the invention, the number M of sub-elements is equal to 10, although a greater or lesser number may also be used.

Figure 6:
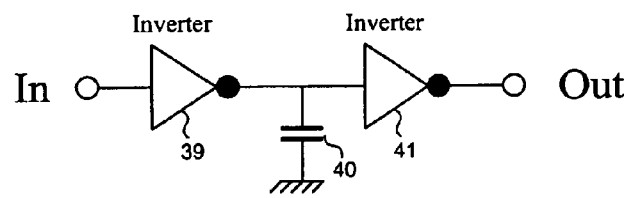
FIG. 6 is a simplified circuit diagram of a delay sub-element in the delay element of FIG. 5

FIG. 6 shows a preferred embodiment of a delay sub-element in the set 36 and comprises an inverter 39 that receives the signal from the previous delay element or, in the case of the first delay element of the series, the signal Tx. The output of the inverter 39 is connected to charge a capacitor 40 connected to ground and the voltage across the capacitor 40 is supplied to a further inverter 41 whose output is connected to the corresponding switch element of the set 37 and, except in the case of the last delay sub-element in the set, to the following delay sub-element. It will be appreciated that this structure offers a ready implementation for the controllable delay element, using simple elementary delay sub-elements and a multiplex arrangement.

Figure 7:
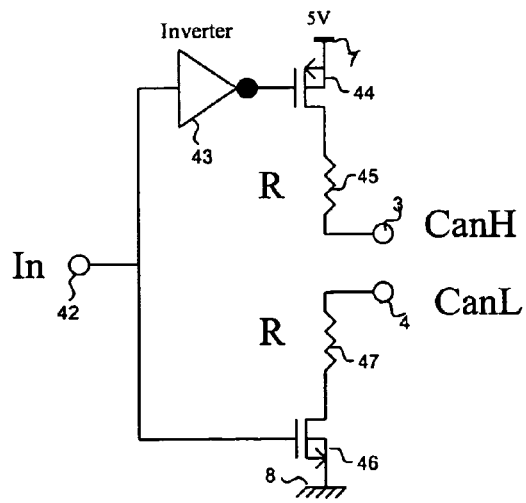
FIG. 7 is a simplified circuit diagram of a driver transfer module in the CAN bus of FIG. 4.

Although the driver shown in FIG. 4 has separate series of delay elements 23 and 24 for the CANH and CANL sides, it is possible to use a single series to control the series of switch elements 17 and 19 and their resistive elements 18 and 20. As shown in FIG. 7, each module comprises an input terminal 42 that is connected to the output terminal of the corresponding delay element, except in the case of the first of the series, for which it is connected to receive the input signal Tx. The input terminal 42 is connected through an inverter 43 to a switch element 44 that is connected in series between the VCC terminal 7 and the resistive element 45 in the series 18 that is connected to the CANH bus line 3. The input terminal 42 is also connected to a switch element 46 that is connected in series between a resistive element 47 that is part of the series 20 and the CANL bus line 4.

The invention claimed is:

1. Communication apparatus including driver means for applying a switched transmission signal to a communication line with a controlled slew rate, said driver means comprising a series of transfer elements and delay means comprising a series of delay elements for introducing respective individual delays in signals applied thereto and for cumulatively establishing operational connections of said transfer elements with said communication line with respective cumulative delays in time, whereby to apply said switched transmission signal progressively to said communication line, wherein said delay means comprises feedback means responsive to said switched transmission signal that said driver means applies to said communication line for controlling the individual delays introduced by said delay elements respectively, so as to control the cumulative delays with which said operational connections of said transfer elements with said communication line are established.

2. Communication apparatus comprising driver means for applying a switched transmission signal to a communication line with a controlled slew rate and a signal receiver connected to respond to signals on said communication line, said driver means comprising a series of transfer elements and delay means comprising a series of delay elements for introducing respective delays in signals applied thereto and for cumulatively establishing operational connections of said transfer elements with said communication line with respective delays in time, whereby to apply said switched transmission signal progressively to said communication line, wherein said delay means comprises feedback means responsive to said switched transmission signal that said driver means applies to said communication line for controlling the delays of said delay elements, so as to control the delays with which said operational connections of said transfer elements with said communication line are established and wherein said feedback means comprises reference means for generating a reference rate signal having a reference rate of change, said reference means being arranged to start generation of said reference rate signal at a start of a slew phase of said switched signal, reference receiver means responsive to a value of said reference rate signal relative to a reference signal, and comparator means responsive to relative times of response of said signal receiver and said reference receiver.

3. Communication apparatus as claimed in claim 2, wherein said driver means is arranged to apply respective first and second switched transmission signals to a pair of said communication lines, said comparator means being responsive to relative times of response of said signal receiver to said first and second switched transmission signals and of the signal from said reference receiver means.

4. Communication apparatus as claimed in claim 1, wherein each of said delay elements comprises a series of delay sub-elements connected to trigger each other in succession, and said feedback means is arranged to select which of said delay sub-elements in said series triggers establishment of an operational connection of the corresponding one of said transfer elements with said communication line.

5. Communication apparatus including driver circuit for applying a switched signal to a communication line with a controlled slew rate, said driver circuit comprising a series of transfer elements and delay circuit comprising a series of delay elements for cumulatively establishing operational connections of said transfer elements with said communication line, whereby to apply said switched signal progressively to said communication line, characterised in that said delay circuit comprises a feedback circuit responsive to the switched signal that said driver circuit applies to said communication line for controlling the individual delays of said delay elements, so as to control the cumulative delays with which said operational connections of said transfer elements with said communication line are established.

6. Communication apparatus as claimed in claim 5, and comprising a signal receiver connected to receive signals from said communication line, wherein said feedback circuit comprises reference circuit for generating a reference rate signal having a reference rate of change, said reference circuit being arranged to start generation of said reference rate signal at the start of a slew phase of said switched signal, reference receiver circuit responsive to the value of said reference rate signal relative to a reference signal, and comparator circuit responsive to relative times of response of said signal receiver and said reference receiver.

7. Communication apparatus as claimed in claim 6 for applying switched signals to a pair of said communication lines, wherein said driver circuit is arranged to apply respective first and second switched signals to the communication lines of said pair, said comparator circuit being responsive to relative times of response of a combined value of said first and second signals and of the signal from said reference receiver circuit.

8. Communication apparatus as claimed in claim 5, wherein each of said delay elements comprises a series of delay sub-elements connected to trigger each other in succession, and said feedback circuit comprises circuits for selecting which of said delay sub-elements in said series triggers establishment of an operational connection of the corresponding one of said transfer elements with said communication line.

* * * * *